(12) United States Patent
Yoshida et al.

(10) Patent No.: US 12,113,416 B2
(45) Date of Patent: Oct. 8, 2024

(54) MOTOR AND ELECTRICAL PRODUCT

(71) Applicant: NIDEC CORPORATION, Kyoto (JP)

(72) Inventors: Yusaku Yoshida, Liaoning (CN); Yu Wang, Liaoning (CN); Jun Gao, Liaoning (CN)

(73) Assignee: NIDEC CORPORATION, Kyoto (JP)

( * ) Notice: Subject to any disclaimer, the term of this patent is extended or adjusted under 35 U.S.C. 154(b) by 310 days.

(21) Appl. No.: 17/706,585

(22) Filed: Mar. 28, 2022

(65) Prior Publication Data

US 2022/0320940 A1 Oct. 6, 2022

(30) Foreign Application Priority Data

Mar. 31, 2021 (CN) .......................... 202110346501.5

(51) Int. Cl.
*H02K 3/50* (2006.01)
(52) U.S. Cl.
CPC ........... *H02K 3/50* (2013.01); *H02K 2203/09* (2013.01)
(58) Field of Classification Search
CPC .............................. H02K 3/50; H02K 2203/09
USPC .......................................................... 310/71
See application file for complete search history.

(56) References Cited

U.S. PATENT DOCUMENTS

| 8,729,754 | B2 * | 5/2014 | Fujii ...................... | H02K 3/522 |
| | | | | 310/90 |
| 10,340,767 | B2 * | 7/2019 | Atarashi ................. | H02K 5/16 |
| 10,630,131 | B2 | 4/2020 | Haberkorn et al. | |
| 10,862,364 | B2 | 12/2020 | Schroeder et al. | |

FOREIGN PATENT DOCUMENTS

| CN | 110829696 | | 2/2020 | |
| CN | 215646428 | | 1/2022 | |
| DE | 102015200089 | | 7/2016 | |
| DE | 102017211392 | | 1/2018 | |
| DE | 102016221681 | | 5/2018 | |
| JP | 2013236455 | | 11/2013 | |
| JP | 2019180197 | * | 10/2019 | ............... H02K 3/50 |

OTHER PUBLICATIONS

English Machine translation of Li et al., CN110829696 (Year: 2020).*
English machine translation, Li et al. CN110829696 (Year: 2020).*

* cited by examiner

*Primary Examiner* — Burton S Mullins
(74) *Attorney, Agent, or Firm* — JCIPRNET

(57) ABSTRACT

The example of the present application provides a motor and an electrical product. The motor includes a rotor that is arranged in a rotatable manner centered on a central axis, a stator arranged on an outer circumference of the rotor and facing the rotor in a radial direction, a bus bar holder arranged on one side of the rotor and the stator in an axial direction, and a housing that is cylindrical or substantially cylindrical. The rotor, the stator, and the bus bar holder are contained inside the housing. The bus bar holder has a protrusion on one side in the axial direction, and the protrusion is in contact with the bottom of the housing.

8 Claims, 4 Drawing Sheets

MOTOR AND ELECTRICAL PRODUCT

CROSS REFERENCE TO RELATED APPLICATIONS

The present invention claims priority under 35 U.S.C. § 119 to Chinese Application No. 202110346501.5 filed on Mar. 31, 2021 the entire content of which is incorporated herein by reference.

FIELD OF THE INVENTION

An example of the present application relates to the mechanical and electrical field, and particularly to a motor and an electrical product.

BACKGROUND

In a conventional motor structure, generally, a package point provided inside the housing is used to limit the axial rattling between the stator core and the housing.

It should be noted that the above description of the technical background only describes the technical solution of the present application clearly and thoroughly and facilitates the understanding of those skilled in the art. The above technical solution should not be considered known to those skilled in the art solely because these solutions are described in the related art part of the present application.

The inventors have found that the conventional package point is provided on the peripheral wall of the motor housing, and in the process of assembling the motor, the rotor and the stator have to be inserted into the housing, and due to assembly errors, in a state where the stator core is not in contact with the package point, the bus bar holder and the bottom of the motor may collide with each other, which leads to damage to the motor.

SUMMARY

One aspect of the example of the present application provides a motor, including:
a rotor that is arranged in a rotatable manner centered on a central axis;
a stator arranged on an outer circumference of the rotor and facing the rotor in a radial direction;
a bus bar holder arranged on one side of the rotor and the stator in an axial direction; and
a housing that is cylindrical and contains the rotor, the stator, and the bus bar holder inside,
wherein the bus bar holder has a protrusion on one side in the axial direction, and the protrusion is in contact with the bottom of the housing.

Another aspect of the example of the present application provides an electrical product having the motor of any example according to the one aspect described above.

The above and other elements, features, steps, characteristics, and advantages of the present application will become more apparent from the following detailed description of the preferred embodiments with reference to the attached drawings.

BRIEF DESCRIPTION OF THE DRAWINGS

The appended drawings are used to provide a further understanding on an example of the present application, and are used to constitute a part of the specification, illustrate an exemplary embodiment of the present application, and explain the principles of the present application along with text description. Obviously, the drawings in the following description are only some examples of the present application, and those skilled in the art may obtain other drawings based on these drawings even without creative labor. In the drawings.

DESCRIPTION OF THE EMBODIMENTS

Figure 1:
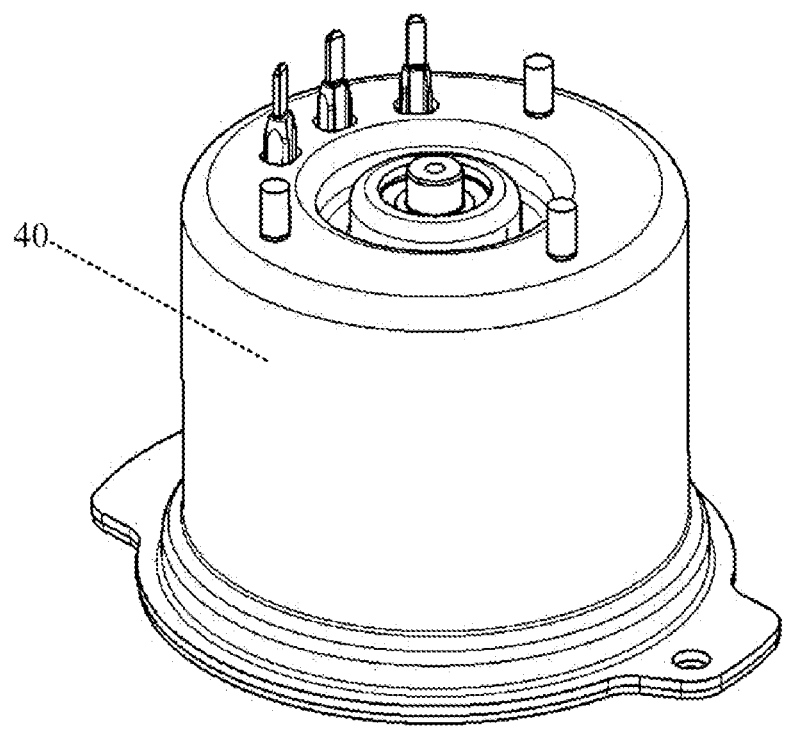
FIG. 1 is a schematic diagram of an example of a motor according to an example of the present application.

With reference to the drawings, the above-described features and other features of the present application are clarified by the following specification. An exemplary embodiment of the present application, which represents some exemplary embodiments in which the principles of the present application may be adopted, is specifically disclosed in the specification and drawings. It should be understood that the present application is not limited to the described exemplary embodiment, and the present application includes all modifications, variations, and equivalents that fall within the scope of the attached claims.

In the example of the present application, the expression "and/or" includes any one or all combinations of one type or plural types of terms listed in connection therewith. The expressions such as "contain" "include" "have" and the like refer to the existence of the stated feature, element, component part, or assembly, but do not exclude the presence or addition of one or a plurality of other features, elements, component parts, or assemblies.

In the example of the present application, the singular form such as "one", "this" or the like may include the plural form. For example, "one kind of" or "one type of" should be broadly understood and is not limited to the meaning of "one". In addition, the expression "the . . . mentioned above" should be understood to include both the singular form and the plural form unless otherwise specified before and after. Also, the expression "according to" should be understood as "at least partially . . . according to" and the expression "based on" should be understood as "at least partially . . . based on" unless otherwise stated before and after.

Note that, in the following description of the present application, for convenience of description, a direction extending along a central axis O of a motor or a direction parallel to the central axis O is referred to as "axial direction"; a direction orientated to the opening of a motor housing from the bottom of the motor housing is referred to as "below" or "lower side" or "lower side in the axial direction" or "the other side in the axial direction"; a direction orientated to the bottom of the motor housing from the opening of the motor housing is referred to as "above"

or "upper side" or "upper side in the axial direction" or "one side in the axial direction"; a radius direction centered on the central axis O is referred to as "radial direction"; a direction of getting close to the central axis O is referred to as "inner side in the radial direction"; a direction of getting away from the central axis O is referred to as "outer side in the radial direction"; and a direction surrounding the central axis O is referred to as "circumferential direction". However, it is worth noting that these are used only for convenience of description and do not limit the orientation of the motor during use and manufacture.

Hereinafter, the embodiment of the example of the present application is described with reference to the drawings.

The example of the present application provides a motor.

Figure 2:
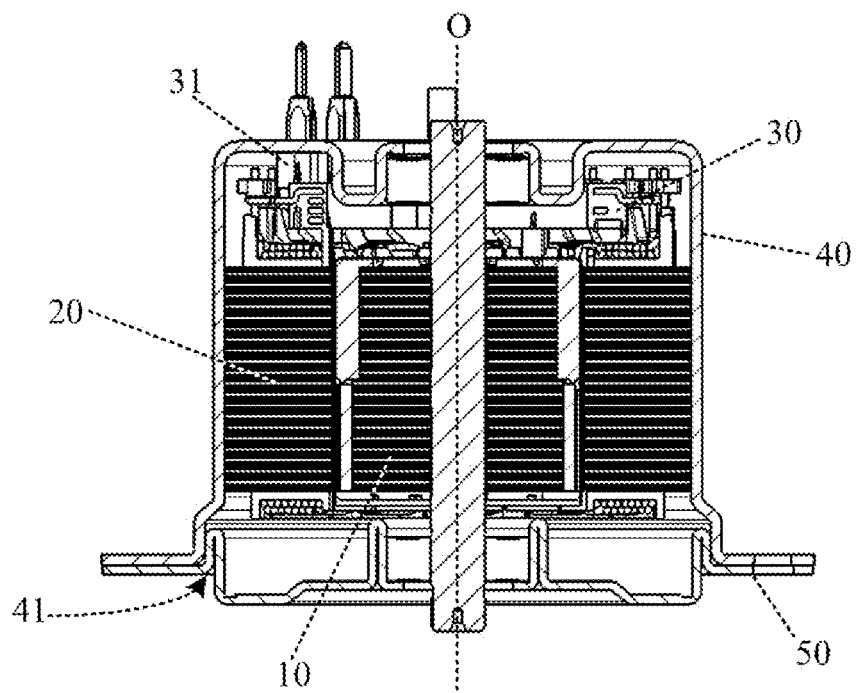
FIG. 2 is a schematic diagram of one axial cross section of the motor shown in FIG. 1.

FIG. 1 is a schematic diagram of an example of a motor according to an example of the present application, and FIG. 2 is a schematic diagram of one axial cross section of the motor shown in FIG. 1. As shown in FIGS. 1 and 2, the motor has a rotor 10, a stator 20, a bus bar holder 30, and a cylindrical or substantially cylindrical housing 40. The rotor 10 is arranged in a rotatable manner centered on the central axis O, the stator 20 and the rotor 10 are arranged to face each other in the radial direction, and the bus bar holder 30 is arranged on one side (the upper side shown in FIG. 2) of the rotor 10 in the axial direction. The housing 40 has an opening 41 on the other side (the lower side shown in FIG. 2) in the axial direction, and contains the rotor 10, the stator 20, and the bus bar holder 30 inside the housing 40.

The above is merely a description of the structure of the motor with an example, and the motor may further include a general assembly, such as a lid 50 shown in FIG. 2, with specific reference to related techniques.

In the example of the present application, as shown in FIG. 2, the bus bar holder 30 has a protrusion 31 on one side in the axial direction (the side facing the bottom of the housing 40), and the protrusion 31 is in contact with the bottom of the housing 40. Therefore, the protrusion 31 is provided on a surface of the bus bar holder 30 on the side facing the housing 40, and with the protrusion 31 in contact with the housing 40, support for the housing 40 is able to be achieved. In addition, the protrusion 31 is able to be replaced with a general package point, axial rattling between the stator core and the housing 40 is limited, and the assembly errors are reduced.

In some examples, the protrusion 31 and the bus bar holder 30 are integrally defined whereby the function of the conventional package point is able to be achieved by a simple structure.

In some examples, the number of protrusions 31 is three or more. Therefore, the bottom of the housing 40 is supported by three or more protrusions 31, and the effect of equilibrium support is able to be achieved.

Figure 3:
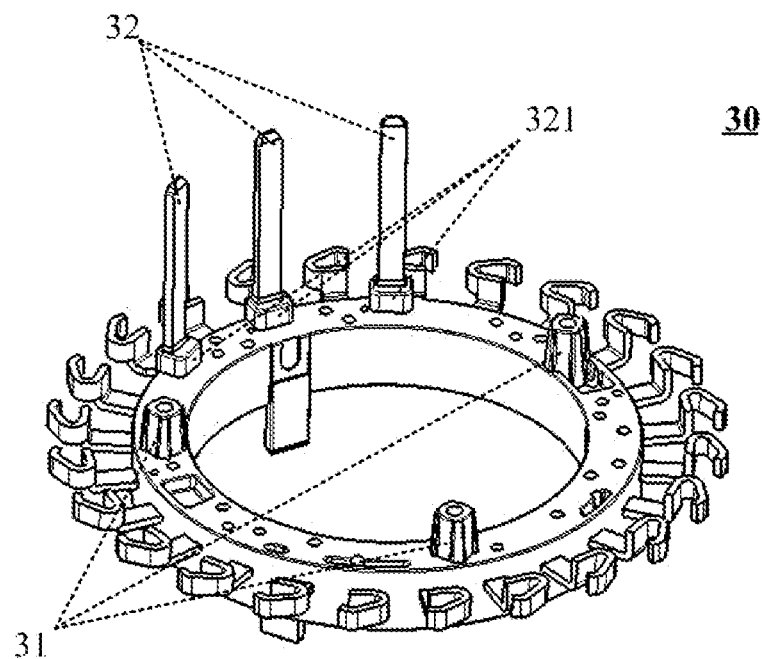
FIG. 3 is a schematic diagram of an example of a bus bar holder for a motor according to an example of the present application.

FIG. 3 is a schematic diagram of an example of the bus bar holder 30.

In some examples, multiple power supply terminals 32 (three power supply terminals 32 are shown as an example in FIG. 3) and a stationary part 33 (not shown in FIG. 3) are further provided on one side of the bus bar holder 30 in the axial direction.

Figure 4:
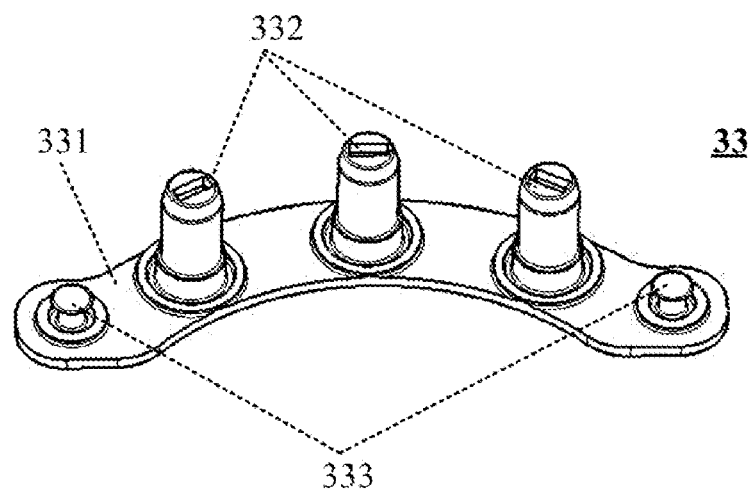
FIG. 4 is a schematic diagram of an example of a stationary part of the bus bar holder shown in FIG. 3.

FIG. 4 is a schematic diagram of an example of the stationary part 33. As shown in FIG. 4, the stationary part 33 is integrally defined, and includes a circumferential extension 331, multiple sleeves 332 extending along the axial direction from one side of the circumferential extension 331 in the axial direction, and two heat welding terminals 333 located on both sides of the multiple sleeves 332 in the circumferential direction. The multiple power supply terminals 32 penetrate the multiple sleeves 332 and extend along the axial direction. With the provision of the stationary part 33, the assembly is convenient and the tolerance is able to be controlled.

In FIG. 4, a column-shaped or substantially column-shaped sleeve 332 is shown as an example, and the present application does not limit the installation height (the height in the axial direction) and the shape of the sleeve 332. As shown in FIG. 4, the sleeve 332 has a through hole that penetrates the sleeve 332 along the axial direction, multiple power supply terminals 32 penetrate the sleeves 332, and the cross-sectional shape of the through hole is determined according to the cross-sectional shape of the power supply terminal 32.

In some examples, the circumferential extension 331 is located inside the housing 40, multiple sleeves 332 and two heat welding terminals 333 extend from the inside of the housing 40 toward the outside of the housing 40, and the positions of the multiple sleeves 332 are fixed by welding the two heat welding terminals 333 outside the housing 40. In this way, the excellent sealing property of the housing 40 is able to be achieved.

In some examples, as shown in FIG. 3, the ends of the multiple power supply terminals 32 on the other side in the axial direction are wrapped with resin to define power supply terminal resin sealing parts 321.

Figure 5:
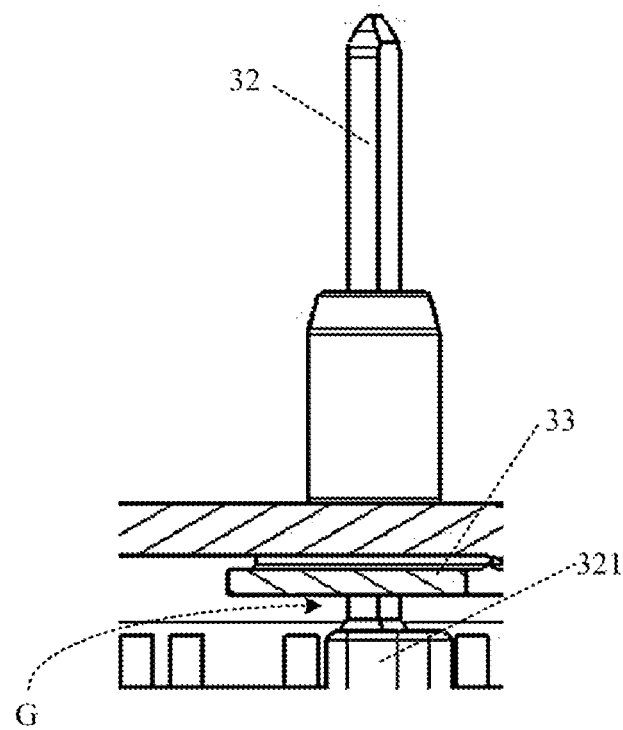
FIG. 5 is a schematic diagram of an example of a stationary part and a power supply terminal sealing part.

FIG. 5 is a schematic diagram of the stationary part 33 and one of the power supply terminal resin sealing parts 321. As shown in FIG. 5, a gap G is defined in the axial direction between the stationary part 33 and the power supply terminal resin sealing part 321. Therefore, it is able to avoid interference between the stationary part 33 and the protrusions 31 supported by the bottom of the housing 40.

Figure 6:
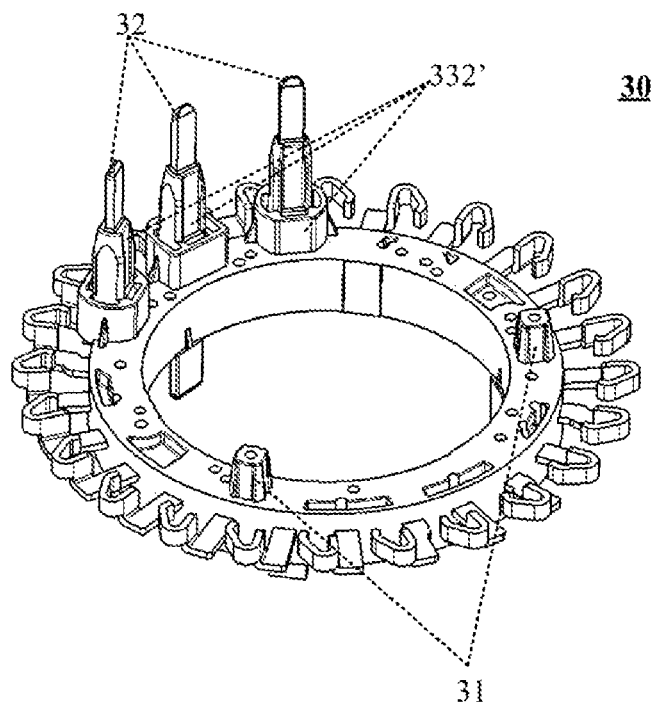
FIG. 6 is a schematic diagram of another example of a bus bar holder for a motor according to an example of the present application.
Figure 7:
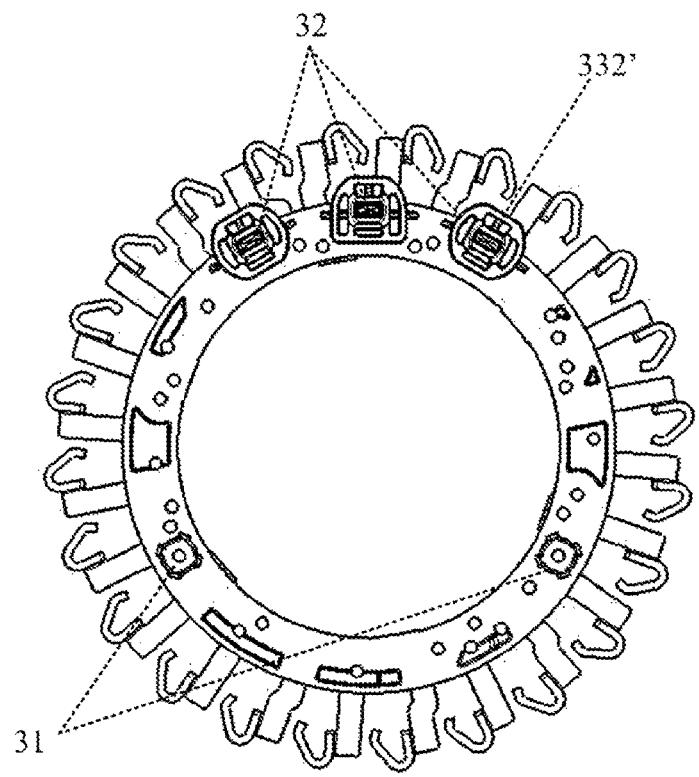
FIG. 7 is a plan view of the bus bar holder shown in FIG. 6.
Figure 8:
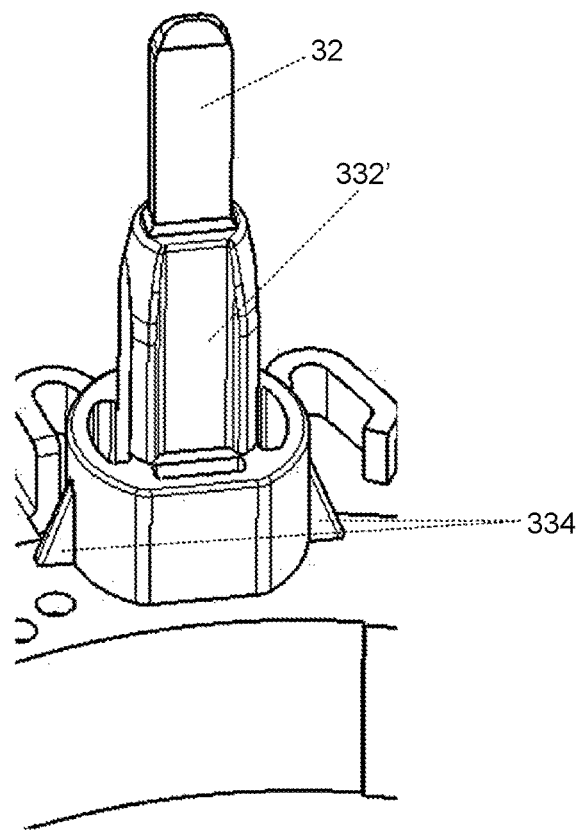
FIG. 8 is a schematic diagram of one power supply terminal of the bus bar holder shown in FIG. 6.

FIG. 6 is a schematic diagram of another example of the bus bar holder 30, FIG. 7 is a plan view of the bus bar holder 30 shown in FIG. 6, and FIG. 8 is a schematic diagram of one power supply terminal 32 of the bus bar holders 30 shown in FIG. 6.

In some examples, as shown in FIGS. 6 and 7, multiple power supply terminals 32 and multiple sleeves 332' respectively covering the multiple power supply terminals 32 are further provided on one side of the bus bar holder 30 in the axial direction, and the multiple sleeves 332' and the bus bar holder 30 are integrally defined. Therefore, the housing 40 is able to be sealed, the power supply terminals 32 are able to be effectively supported, and the movement of the power supply terminals 32 is able to be prevented.

In some examples, the sleeve 332' is step-shaped or substantially step-shaped, as shown in FIGS. 6 and 7, and the height in the axial direction of the step of one of the sleeves 332' is greater than the height in the axial direction of the step of another one of the sleeves 332'. For example, the height of the step of the sleeve 332' in the center shown in FIGS. 6 and 7 is greater than the heights of the steps of the two sleeves 332' on both sides. Therefore, the step of the sleeve 332' in the center is possibly used as the above-mentioned protrusion 31, and are supported by the bottom of the housing 40 together with the other protrusions 31, which not only achieves the function of a general package point but also achieves the effect of sealing.

In the above example, as shown in FIGS. 6 and 7, the number of protrusions 31 is two, and the heights in the axial direction of the protrusions 31 are the same as the height in the axial direction of the step of one of the sleeves 332' described above (for example, the step of the sleeve 332' in the center). Therefore, by surrounding the step of the power supply terminal 32, the bottom of the housing 40 is able to be jointly supported together with the two protrusions 31, and the assembly errors are able to be reduced.

In some examples, as shown in FIG. 8, ribs 334 are further provided on both sides of the step of the sleeve 332' in the circumferential direction, and the ribs 334 are able to achieve effective support for the sleeve 332' and increase the strength of the sleeve 332'. The present application does not limit the embodiments, shapes, and positions of the ribs 334.

It is worth noting that the above description is only an exemplary description of the configuration of the motor related to the present application, the present application is not limited thereto, and appropriate variations may be made based on each of the above examples. In addition, the above description is only an exemplary description of each member, the present application is not limited thereto, and related techniques may be referred to for the specific contents of each member. Moreover, members not shown in FIGS. 1 to 8 may be added, or one or multiple members in FIGS. 1 to 8 may be reduced. As for other configurations and structures of the motor, related techniques may be referred to, and the description is omitted herein.

According to the example of the present application, the assembly errors are able to be reduced by providing the bus bar holder with a protrusion in contact with the bottom of the housing to replace the conventional package point.

An example of the present application provides an electrical product having the motor described in the example of the first aspect. The structure of the motor is described in detail in the example of the first aspect, the contents thereof are incorporated here, and thus the description thereof is omitted here.

In the example of the present application, the electrical product may be any electrical equipment in which a motor is installed. For example, the electrical product may be a household electrical appliance such as an indoor unit of an air conditioner, an outdoor unit of an air conditioner, a water supply machine, a washing machine, a vacuum cleaner, a compressor, a blower, and a mixer, may be industrial equipment such as a pump, a conveyor, an elevator, a standard industrial general-purpose mounter, a wind generator, a grinder, a traction motor, or various information processing equipment, and may be each member of an automobile such as an electric power steering system of an automobile, a sunroof adjuster of an automobile, a seat adjuster, a transmission, and a brake device.

Although the present application has been described above in association with the exemplary embodiment, those skilled in the art should understand that these descriptions are all exemplary and are not restrictions on the scope of protection of the present application. Those skilled in the art may make various variations and modifications to the present application based on the gist and principle of the present application, and these variations and modifications are also within the scope of the present application.

The exemplary embodiments of the present application have been described above with reference to the drawings. Many features and advantages of these exemplary embodiments are obvious according to the detailed specification. Therefore, the attached claims are to cover all those features and advantages of these exemplary embodiments that fall within the true gist and scope. Moreover, because those skilled in the art are able to easily conceive of many modifications and changes, the exemplary embodiments of the present application are not limited to the precise structures and operations as illustrated and described, and encompass all suitable modifications and equivalents that fall within the scope thereof.

Features of the above-described preferred embodiments and the modifications thereof may be combined appropriately as long as no conflict arises. While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor, comprising:
    a rotor that is arranged in a rotatable manner centered on a central axis;
    a stator arranged on an outer circumference of the rotor and facing the rotor in a radial direction;
    a bus bar holder arranged on one side of the rotor and the stator in an axial direction; and
    a housing that is cylindrical and contains the rotor, the stator, and the bus bar holder inside,
    wherein the bus bar holder has a protrusion on one side in the axial direction, and the protrusion is in contact with a bottom of the housing,
    wherein a plurality of power supply terminals and a plurality of sleeves respectively covering the plurality of power supply terminals are further provided on one side of the bus bar holder in the axial direction, and the plurality of sleeves and the bus bar holder are integrally defined,
    wherein the plurality of sleeves are step-shaped, and a height in the axial direction of a step of one of the plurality of sleeves is greater than a height in the axial direction of a step of another one of the plurality of sleeves.

2. The motor according to claim 1, wherein the protrusion and the bus bar holder are integrally defined.

3. The motor according to claim 1, wherein the number of the protrusions is three or more.

4. The motor according to claim 1, wherein the number of the protrusions is two, and heights in the axial direction of the protrusions are the same as the height in the axial direction of the step of the one of the plurality of sleeves.

5. An electrical product, comprising the motor according to claim 1.

6. A motor, comprising:
    a rotor that is arranged in a rotatable manner centered on a central axis;
    a stator arranged on an outer circumference of the rotor and facing the rotor in a radial direction;
    a bus bar holder arranged on one side of the rotor and the stator in an axial direction;
    a housing that is cylindrical and contains the rotor, the stator, and the bus bar holder inside; and
    a plurality of power supply terminals and a stationary part on one side of the bus bar holder in the axial direction,
    wherein the bus bar holder has a protrusion on one side in the axial direction, and the protrusion is in contact with a bottom of the housing,
    wherein the stationary part is integrally defined, and comprises a circumferential extension, a plurality of sleeves extending along the axial direction from one side of the circumferential extension in the axial direction, and two heat welding terminals located on both sides of the plurality of sleeves in a circumferential direction, and
    wherein the plurality of power supply terminals penetrate the plurality of sleeves and extend along the axial direction.

7. The motor according to claim 6, wherein the circumferential extension is located inside the housing, the plurality of sleeves and the two heat welding terminals extend from an inside of the housing toward an outside of the housing, and positions of the plurality of sleeves are fixed by welding the two heat welding terminals outside the housing.

8. The motor according to claim 6, wherein ends of the plurality of power supply terminals on the other side in the axial direction are wrapped with resin to define power supply terminal resin sealing parts, and a gap is defined in the axial direction between the stationary part and the power supply terminal resin sealing part.

* * * * *